Nov. 9, 1943.  E. T. JOHNSON  2,333,793
CONDITION RESPONSIVE INDICATING INSTRUMENT
Filed Feb. 29, 1940  2 Sheets—Sheet 1
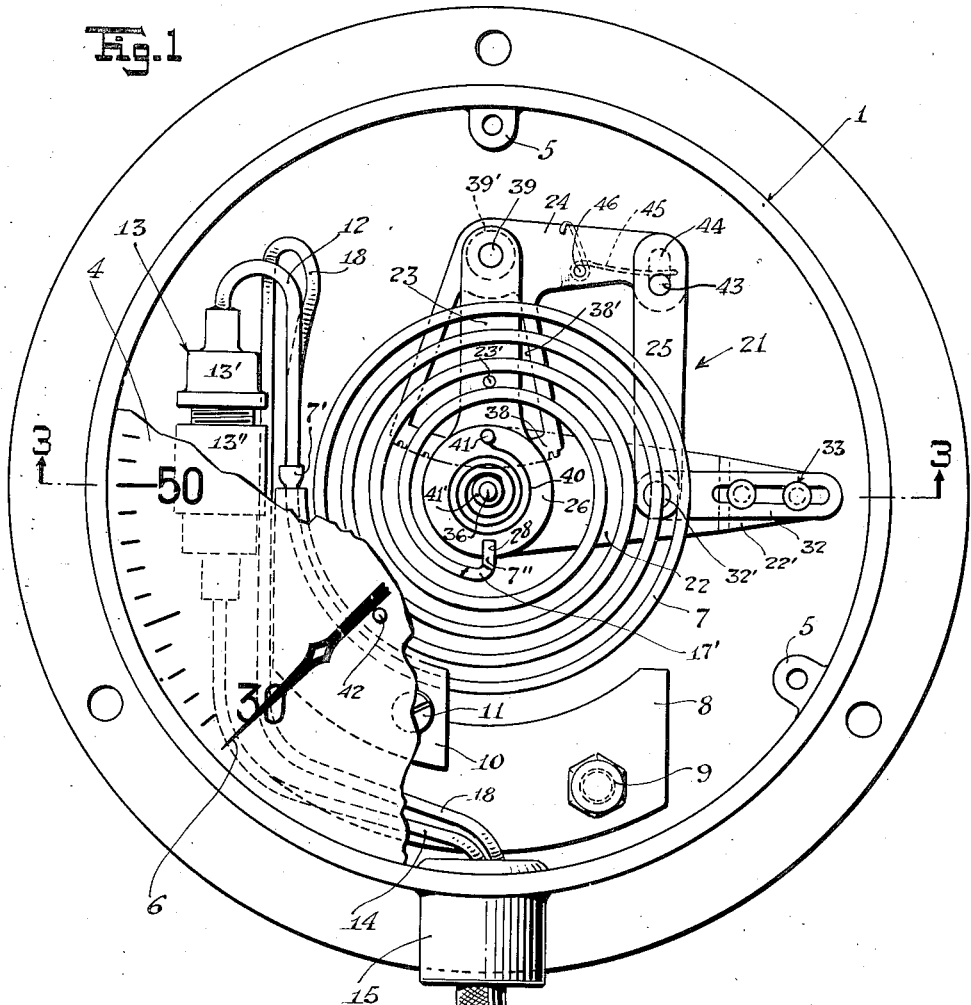
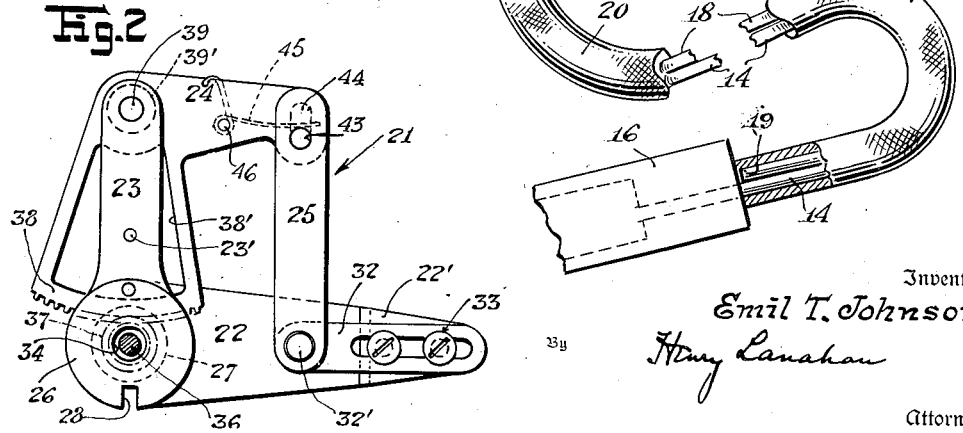
Inventor
Emil T. Johnson
Henry Lanahan
Attorney Nov. 9, 1943.                E. T. JOHNSON                2,333,793
            CONDITION RESPONSIVE INDICATING INSTRUMENT
                    Filed Feb. 29, 1940        2 Sheets-Sheet 2
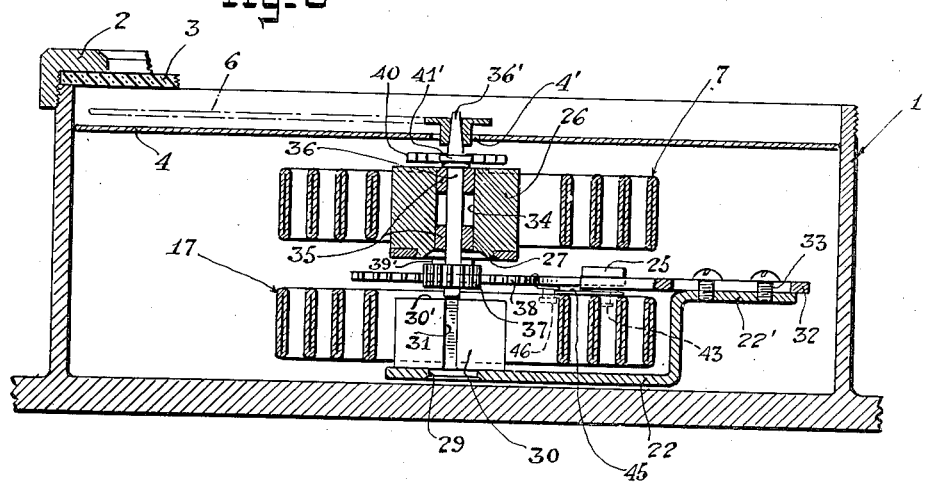
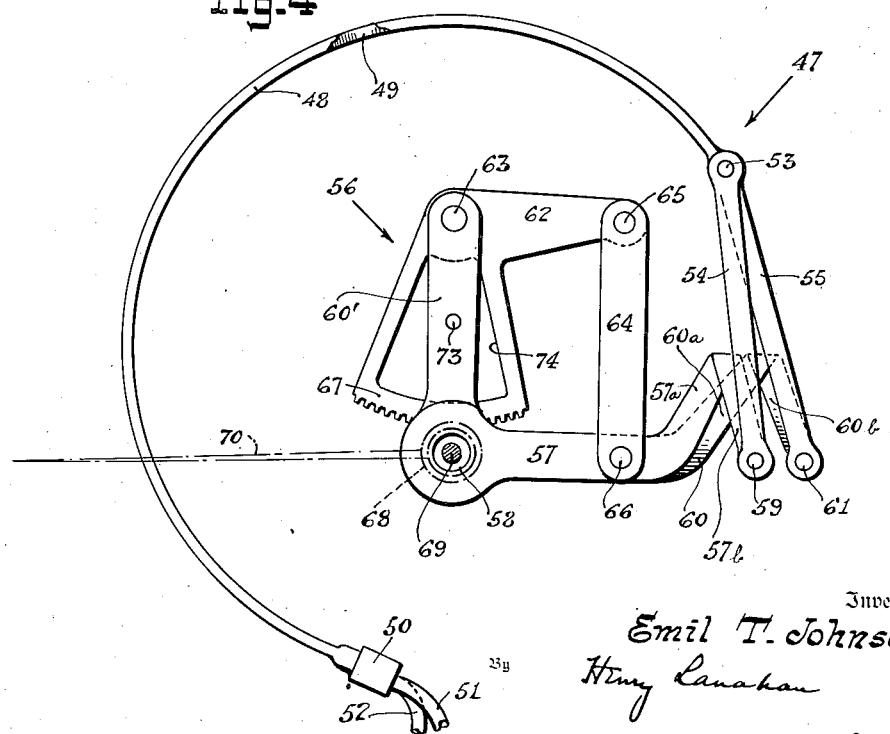

Patented Nov. 9, 1943

2,333,793

UNITED STATES PATENT OFFICE 2,333,793

CONDITION RESPONSIVE INDICATING INSTRUMENT

Emil T. Johnson, West Orange, N. J., assignor to Thomas A. Edison, Incorporated, West Orange, N. J., a corporation of New Jersey Application February 29, 1940, Serial No. 321,484

19 Claims. (Cl. 73—370)

This invention relates to instruments for indicating variations in a predetermined condition such as temperature, pressure or the like, and has particular significance to indicating instruments of the type which measure the differential between two such conditions and to compensated forms of instruments employing the differential principle. The invention is especially concerned with an improved mechanism for operatively interconnecting the motor means and indicating pointer of an instrument.

It is an object of my invention to provide a compact form of indicating instrument having a highly accurate performance.

It is another object of my invention to provide an improved indicating instrument having a linear (i. e. uniform) scale and a high degree of sensitivity and ruggedness.

It is another object to provide indicating instruments compensated for errors and/or indicating instruments of the differential type, which have the desirable features just mentioned.

It is another object to provide an improved form of compensated instrument wherein the compensation is uniform throughout the range of the instrument.

It is another object to provide a mechanism for coupling the motor means of the instrument to the indicating pointer, which is simple in form, linear in its response (i. e., transmission) characteristic and highly stable in action.

Another object is to provide a coupling mechanism adapted for use in differential-type indicating instruments and having the desirable features just noted.

It will be seen that the coupling mechanism of the instant invention is particularly well adapted to motor means (for indicating instruments) of the type having actuated portions that move angularly in response to variations in the condition to be measured—a well-known type of such motor means being the Bourdon spring. The particular suitability of this coupling mechanism to Bourdon-spring types of instruments arises from the fact that the coupling mechanism provides a linear transmission from the motor means to the indicating pointer of the instrument, and yet permits a highly compact arrangement of the instrument in that the coupling mechanism may be positioned and the indicator pointer pivoted each within the circumferential boundary of the Bourdon spring. In instruments of the differential type wherein there are employed two Bourdon springs, these springs may be coaxially arranged adjacent to one another with the coupling mechanism positioned within the boundary of the springs; yet this mechanism will provide a linear coupling between the springs and the pointer as above mentioned. Although this coupling mechanism is particularly well suited and is illustrated and described in connection with instruments employing Bourdon springs, it will be understood that no unnecessary limitation of my invention to motor means of the Bourdon-spring type is intended.

In the following description and the appended claims other and allied objects and features of my invention are more fully set forth.

In the description of my invention reference is had to the accompanying drawings, of which:

Figure 1 is a face view, partly broken away, of an indicating instrument incorporating my invention and of a type for indicating temperature at a distance, this kind of instrument being commonly known as a "distance-type" thermometer;

Figure 2 is a view of the mechanism of Figure 1 which couples the motor elements of the instrument to the indicating pointer;

Figure 3 is a partial cross-sectional view taken substantially along the line 3—3 of Figure 1; and Figure 4 is a fragmentary view of an instrument in accordance with my invention as adapted to indicate the differential between two predetermined conditions such as the difference between two distinct pressures.

Reference being had to Figures 1 and 3 there will be seen an indicating instrument in the form of a "distance type" thermometer comprising a circular casing 1, preferably molded of Bakelite, onto the open end of which is threaded a bezel 2 for holding a crystal or glass 3. Beneath the glass 3 there is provided a dial 4 supported by the casing on lugs such as 5. Pivoted at the center of the dial is an indicating pointer 6 which is moved relative to a suitable scale on the dial to indicate variations in the conditions being measured.

The actuating or motor means for the instrument may be of a liquid expansion type employing a Bourdon spring 7 as the motor element, which spring may have a plurality of turns bent in the form of a spiral as shown. This spring is preferably positioned centrally of the dial 4 with its axis in line with that of the pointer 6, in which position it may be held by a bracket 8 secured to the casing 1 by bolts such as 9, the outer end portion of the Bourdon spring being clamped to this bracket by means of a clamping bar 10 and screws such as 11. The outer end 7' of the Bourdon spring 7 is fitted onto one end of a short tube 12 and sealed thereto as by soldering. The other end of the tube 12 makes connection with a connector fitting 13 comprising upper and lower parts 13' and 13" suitably threaded together to form an airtight seal therebetween. From this connector fitting there leads a capillary tube 14 made for example of steel. This capillary tube passes out of the casing through an apertured boss 15 and communicates at its other end with a thermostat or bulb 16, the tube being sealed airtight to the bulb. The bulb is to be positioned at the point at which the temperature is to be measured and consequently the minimum length of the capillary tube 14 is determined by the distance between such point and the instrument; in practice, this distance may vary anywhere from a few feet to several hundred feet.

The motor system above described—i. e., the system comprising the bulb 16, capillary tube 14, fitting 13, tube 12 and Bourdon spring 7—is hermetically sealed to the outside and completely filled with a suitable thermally expansive fluid or liquid, which may typically be substantially pure mercury. Since the volume of mercury varies in accordance with its temperature, variations in the temperature at the bulb will cause similar variations in the volume of the mercury in the bulb; these volume variations cause mercury to be forced along the capillary tube 14 into and out of the Bourdon spring 7 to actuate the inner end portion 7' of the spring in clockwise and counterclockwise directions.

In the motor system just described, it is particularly desirable that the ratio of the volumetric capacity of the bulb 16 to that of the remaining portion of the system be large in order that the Bourdon spring will be highly sensitive to variations in the temperature of the bulb and be fairly insensitive to variations in the temperature of the other portions of the motor system. There are, however, practical restrictions which set a limit on the maximum value of this ratio. In practice, the minimum diameter of the bore of the capillary tube 14 is not permitted to be smaller than about .010". When the capillary tube is made long, say 25 feet or more, its volumetric capacity becomes appreciable in relation to that of conveniently sized thermostatic bulbs; as a result, variations in temperature along the capillary tube will cause an actuation of the indicating means which is appreciable in relation to that caused by variations in temperature at the bulb, thereby introducing errors in the reading of the instrument.

To compensate for errors in the reading of the instrument caused by variations in the temperature along the capillary tube 14 and also for errors caused by variations in the temperature of the instrument itself, there is provided a second or compensating motor element. These two motor elements are then differentially connected to the indicating pointer of the instrument in a manner to cause the indicating means to be moved in accordance with the differential in the actuations of the two motor elements.

This second motor element comprises a Bourdon spring 17 which is preferably made in all respects similar to the Bourdon spring 7 as for the advantages hereinafter pointed out. In view of the particular type of differential mechanism which I employ for operatively connecting these springs to the indicating pointer 6—which mechanism is hereinafter described—the two Bourdon springs may be coaxially disposed next to each other in a highly compact arrangement, as shown in Figure 3. This second Bourdon spring is sealed at its inner end 17' and is supported at its outer end portion as by the bracket 8 in the manner in which the spring 7 is supported. Coupled to the outer end portion of the spring 17 is a capillary tube 18 (see Figure 1) which extends along the tube 12, the connector fitting 13 and the capillary tube 14 throughout the length of the latter, the tube 18 extending out of the casing through the boss 15 and terminating as at 19 at the bulb 16. The terminal end 19 of the tube 18 is hermetically sealed. The portions of the capillary tubes 14 and 18 between the instrument and the bulb 16 are held together in parallel relation to each other by a protective armor 20 preferably in the form of a flexible braided sheath. The Bourdon spring 17 and capillary tube 18 are also completely filled with the thermally expansive fluid employed in the motor system above described, which fluid in the present instance is mercury. Because of the similarity of the Bourdon springs 7 and 17 and of the similarity and proximity of the capillary tubes coupled to these springs, temperature variations at the instrument and along the capillary tubes will cause similar actuations of the Bourdon springs, these actuations appearing as angular movements of the inner end portions of the springs and being in a clockwise direction for a temperature rise and in a counter-clockwise direction for a temperature fall.

It is a characteristic of the motor means above described that it has a linear response, the Bourdon springs being linearly responsive to variations in their internal pressures and the volume of the liquid in the thermostatic means coupled to the springs varying linearly in relation to temperature. With such a motor system it is highly important that the mechanism coupling the motor means to the indicating pointer of the instrument have also a linear response characteristic (i. e., a constant movement-transmitting ratio throughout the range of the instrument) snice such a coupling mechanism will then permit the use of a linearly calibrated dial; the use of such a dial will eliminate criticalness of adjustment of the instrument and tend in the end to make the instrument more rugged and lower in cost. It is also important that the coupling mechanism produce a high degree of amplification in movement and be yet stable in action so as to render the instrument highly sensitive and yet free from flutter or vibration of the indicating pointer; and, in addition, that the coupling mechanism permit a compact arrangement of the parts of the instrument to permit a reduction in the overall size of the instrument. The coupling mechanism now to be described permits the attainment of these objectives in a highly simple manner.

The coupling mechanism above referred to is designated by the reference character 21 and comprises four rigid links jointed together to form a substantially parallelogrammatic link structure, the links of this structure being represented in the order of their appearance, proceeding in a clockwise direction about the structure from the lower link thereof, as 22, 23, 24 and 25, respectively. The two adjacent links or drive members 22 and 23 are respectively connected to the Bourdon springs 17 and 7, and positioned so that the axis of the joint common to the two links coincides with that of the Bourdon springs. The connection of the link 23 to the Bourdon spring 7 is made by way of a hub 26 which extends axially through the spring (see Figure 3); the link 23 is staked as at 27 to the bottom of the hub and the hub is secured to and supported by the spring 7, the connection between the hub and spring being made by fitting the inner end portion 7″ of the spring into a slot 28 of the hub and securing the portion 7″ in the slot as by soldering. The connection between the link 22 and Bourdon spring 17 is made in a manner similar to that between the link 23 and spring 7, the link 22 being staked as at 29 to a hub 30 extending axially through the spring 17 and the hub being provided with a slot 31 into which is fitted and secured the inner end portion 17′ of the spring 17. The outer ends of the links 22 and 23 are operatively connected together by the links 24 and 25. Since the links 24 and 25 are positioned between the springs 7 and 17, the outer end portion 22′ of the link 22 (which link is in the particular embodiment positioned below the spring 17) is offset upwardly to a level just above the top of the spring 17. Secured to the portion 22′ of the link 22 is a short bar 32 which is pivoted at its inner end, as at 32′, to the link 25. In order that the effective length of the link 22 may be adjusted the bar 32 is adjustably connected to the link 22 as by means of a screw and slot connection 33.

Extending axially through the hub 26 is an opening 34 and fitted into the upper and lower end portions of this opening are collars 35 which serve as bearings for a shaft 36. This shaft rests at its lower end on the upper face 30′ of the hub 30 and has its upper end portion 36′ projecting through an opening 4′ at the center of the dial 4; on this upper end portion of the shaft is mounted the indicating pointer 6.

Secured to the lower end portion of the shaft 36, as by a press fit, is a pinion or follower 37 which meshes with a gear segment 38 integrally formed with the link 24. The gear segment has its axis coinciding with that of the pivot pin 39 which joins the links 23 and 24, and is spaced somewhat below the link 23, as for clearance purposes, by means of a spacer 39′ embracing the pivot pin 39. The gear segment 38 is provided with a central opening 38′ and on the link 23 there is provided a pin 23′ which extends through this opening to act as a stop to prevent the gear segment from being moved out of engagement with the pinion. To prevent play between the teeth of the pinion and of the gear segment the shaft 36 is biased torsionally by means of a hair spring 40 secured at its outer end to a pin 41 on the hub 26 and at its inner end to a small collar 41′ on the shaft.

Since the links 22 and 23 of the structure 21 are respectively directly connected to the Bourdon springs 17 and 7, these links will be moved angularly in accordance with the actuations of their respective springs, and consequently, the variations in the angle between these links will represent the algebraic difference in the actuations of the springs. It is a characteristic of a jointed parallelogrammatic structure that a variation in the angle between two adjacent sides of the structure will be accompanied by variations of the same magnitude in the angle between each pair of adjacent sides of the structure. Thus a differential in the actuation of the Bourdon springs 7 and 17 will be proportionately represented by the change in angle between any two adjacent links of the structure 21, or what is the same thing, by the extent of the angular movement of the gear segment 38 (about the pivot 39) relative to the link 23. When one of the Bourdon springs is actuated to an extent equivalent to an error in the actuation of the other spring, this error will then not be represented by the angular movement of the gear segment about the pivot 39 since the gear segment is turned only in accordance with the differential between the actuations of the Bourdon springs.

The angular movement imparted to the pinion 37, and thus to the indicating pointer 6, by the gear segment 38 comprises two components: A component of movement caused by the turning of the gear segment 38 about the pivot 39; and a component arising from the planetary movement of the gear segment about the axis of the Bourdon springs, which latter component arises from the turning of the link 23 by the Bourdon spring 7 about the shaft 36. The first component in the movement of the indicating pointer is directly proportional to the angular movement of the gear segment 38 about the pivot 39, but is stepped up in the ratio of the magnitude of the radius of the gear segment to that of the pinion 37, this ratio being typically from 10 to 15; the second component is directly equal to the angular movement of the link 23 about the shaft 36. Thus, the movement-transmitting ratio between the link 23, to which the Bourdon spring 7 is connected, and the indicating pointer has a magnitude equal to that of the step-up ratio just mentioned plus unity, the additional quantity being due to the second component in the movement of the pointer, as above mentioned; whereas the movement-transmitting ratio between the link 22 to which the compensating spring 17 is connected and the indicating pointer is the same as the step-up ratio between the gear segment 38 and the pinion 37. Because of this inequality in the movement-transmitting ratios of the couplings between the indicating pointer and the Bourdon springs, the pointer is not moved in a manner directly proportional to the differential in the actuations of the springs. This inequality in the movement-transmitting ratios may, however, be readily compensated, one means of compensation being now described.

It is seen that the difference in the movement-transmitting ratios of the couplings between the indicating pointer and the Bourdon springs is one that is fixed in value throughout the range of the instrument, since one of these movement-transmitting ratios is the same as that between the gear segment and the pinion and the other ratio is larger than the first by one. This inequality may therefore be compensated by causing the magnitudes of the actuations of the Bourdon springs, produced in response to a change in the condition the effect of which is to be annulled, to be inversely proportional to the magnitudes of the transmitting ratios of the respective couplings between the springs and the indicating pointer. Say, for example, the movement-transmitting ratio between the gear segment 38 and pinion 37 is 15:1. In the instrument as above described, the movement-transmitting ratio between the compensating spring 17 and pointer 6 will then be 15:1, whereas that between the motor spring 7 and the pointer will be 16:1. To compensate accurately for a change in temperature between the instrument and the bulb 16, such temperature change should produce actuations in the compensating and motor springs the magnitudes of which are respectively in the ratio of 16:15. Such predetermined ratio in the response of the springs 17 and 7 may be effected by merely causing the cross sectional areas of the bores of the capillary tubes 18 and 14 to be in the proportion of the ratio desired in the response of the springs.

In the instrument as above described the indicating pointer is moved to register the differential between two predetermined conditions each of which are variable, one of these conditions being the varying temperature in the region along the capillary tube 14 and in the region at the bulb 16, and the other condition being merely the varying temperature along the capillary tube. While the coupling mechanism 21 is particularly applicable to instruments of the type adapted to measure the differential between two such variables, it will be understood that this mechanism may be also advantageously employed in instruments of the type responsive to variations in but a single condition. In utilizing the coupling mechanism 21 in an instrument of the latter type, one of the links 22 and 23 would be held fixed in position—the same as occurs in respect of the link 22 in the instrument above described when the temperature remains constant at the instrument and along the capillary tube 14—whereas the other link is coupled to a motor element such as the spring 7.

It will be seen that the coupling mechanism hereinabove described is not subject to errors of non-linearity in its transmission characteristic; this is because the entire transmission from the motor means to the indicating means of the instrument is on a linear, angular basis wherein each operative part accurately transmits its own angular movement to the next. For instance, since the links or drive members 22 and 23 are pivoted to move about the axis of the Bourdon springs as a center and are directly connected to the Bourdon springs respectively, they will be turned about their pivot axes exactly in accordance with the angular movements of the inner end portions 7'' and 17' of the springs; and by reason of the linear movement-transmitting characteristics of the parallelogrammatic link structure 21, the angular movements of the drive members will be transmitted linearly, but in opposite directions, through the gear segment 38 and pinion 37 to the indicating pointer.

It is often desirable that a stop be provided to limit the travel of the indicating pointer relative to the scale on the dial. Such a stop may well be in the form of a pin on the dial against which the pointer may abut, one such pin for limiting the pointer 6 to the minimum point on the scale appearing as 42 in Figure 1. In order that delicate parts of the instrument such as the pointer should not be subjected to undue strain should the bulb 16 be subjected to temperatures below the minimum temperature on the scale, I provide a yieldable connection between the pointer and the motor means of the instrument. This yieldable connection is preferably provided at a joint in the link structure 21, for example, between the links 24 and 25, and may comprise a pivot pin 43 on the link 25 which is extended through a slot 44 in the link 24 and biased against the lower end of this slot by a spring 45, the spring being coiled about a pin 46 on the link 24, hooked at one end on the edge of the link and bearing at the other end against the pin 43. During the operation of the instrument through its normal range the pin 43 is held in the lower end of the slot 44 by the spring; however, should the spring 7 be actuated to move the pointer below the minimum point on the scale the stopping of the pointer by the stop 42 will cause the spring 45 to yield and permit the pin 43 to move up through the slot 44.

A characteristic of the type of coupling mechanism 21 herein employed is that it has a linear response as whenever the links are connected to form substantially a parallelogram. A linear response characteristic is highly desirable, yet in some cases it may be desirable to have a coupling mechanism with a sloping response characteristic as for the purpose of compensating for non-linear response characteristics of other parts of the instrument. In such cases I may change the effective length of one or more of the links of the mechanism—for example, by the screw and slot connection 33 to change the effective length of the link 22 as above described. It will also be understood that I may, by means of the screw and slot connection 33, vary the movement-transmitting ratios between the motor and indicating means to fit particular needs.

In Figure 4 there is shown another form of indicating instrument in accordance with my invention. This instrument, appearing as 47, may for example, be employed to measure the differential between two predetermined conditions such as two different pressures and may therefore be termed a differential pressure gauge. This gauge comprises two pressure-sensitive elements or Bourdon springs 48 and 49 coaxially arranged one above the other and each having, for example, only a fraction of a single turn. The springs are supported at one end, as at 50, and there respectively connected to tubes 51 and 52 which may lead to any desired points to bring the Bourdon springs in communication with the media the pressures of which are to be measured; the other ends of the springs are sealed and pivoted as at 53 to links 54 and 55 respectively, which links connect the Bourdon springs to a coupling mechanism 56 disposed within the circumferential boundary of the Bourdon springs; this mechanism is basically of the same type as that of the coupling mechanism 21 heretofore described.

The coupling mechanism 56, like the mechanism 21, is in the form of a four-sided link structure jointed substantially in parallelogram form. This mechanism comprises a lever or drive member 57 pivoted at one end near the axis of the Bourdon springs as at 58 and pivotally connected at the other end as at 59 to the link 54; a right angular lever or drive member 60 pivoted at its vertex also at 58 and having one arm lying substantially below the arm 57 and pivotally connected at its far end, as at 61, to the link 55 and having another arm 60' disposed substantially at right angles to the lever 57; a link 62 pivoted as at 63 on the far end of the arm 60'; and another link 64 pivoted at one end by a pin 65 to the link 62 and at the other end by a pin 66 to the lever 57 at a point intermediate of its length. Provided on the link 62 symmetrically about the pivot axis 63 is a gear segment 67 which meshes with a pinion 68 pivoted on a shaft 69 which is axially disposed in relation to the pivot axis 58. Secured to this shaft, as in any suitable manner, is an indicating pointer 70.

In the coupling mechanism just described the arm 60' of the lever 60, the links 62 and 64, and the lever 57 constitutes a link structure jointed substantially in parallelogram form. This structure, like that of the coupling mechanism 21 heretofore described, has the characteristic that a change in the angle between two adjacent links of the structure is accompanied by a like change in each of the other angles of the structure; and moreover that such angular change is represented also by the extent of the turning of the gear segment 67 about its pivot axis 63 on the arm 60'. Thus angular movements between the lever 57 and arm 60', such as may be caused by a difference in the actuations of the Bourdon springs, will be transmitted directly in terms of angular movement of the gear segment 67 about the axis 63 and this in turn to the pinion 68, in the ratio of the magnitude of the radius of the gear segment to that of the pinion, and then to the indicating pointer 70.

The magnitudes of the movement-transmitting ratios between the levers 57 and 60—the levers respectively connected to the Bourdon springs 48 and 49—and the indicating pointer will again differ by one due to the planetary movement of the gear segment 67 about the pivot axis 58 caused by the turning of the lever 60 about this axis. To compensate for this inequality in the movement-transmitting ratios, in the instant case, I cause the effective movement-transmitting ratios of the couplings between the Bourdon springs 48 and 49 and respective levers 57 and 60 to be inversely proportional to the transmitting ratios of the couplings between the respective levers and the pointer. This is done by adjusting the effective length of the levers 57 and 60, the lever 57 being made the shorter because the coupling between this lever and the indicating pointer is the one having the lower movement-transmitting ratio. In order that the effective length of the levers 57 and 60 may be readily adjusted they are made of semi-rigid material, say for example of brass, and provided near their ends with short laterally extending portions 57a and 60a that are turned back to terminate into short laterally extending arms 57b and 60b, these latter arms being pivotally connected at their outer ends, as at 59 and 61 aforementioned, to the links 54 and 55 respectively. It will be seen that this arrangement permits the arms 57b and 60b to be bent inwardly and outwardly to vary the distance between the pivot axis 58 and the pivots 59 and 61 respectively.

The pressure gauge 47, like the "distance-type" thermometer above described, may be provided with a means to prevent the gear segment 67 from being moved out of engagement with the pinion 68, and to limit the travel of the pointer 70; such means may comprise a stop pin 73 on the arm 60' which is extended through an opening 74 in the gear segment 67 to limt the angular movement of the gear segment about the pivot 63.

Although I have herein illustrated and described my invention in terms of certain specific embodiments it will be understood that these embodiments are merely illustrative and not limitative of my invention, the scope of which I now undertake to express according to the following claims.

I claim:

1. In an instrument of the character described comprising indicating means actuated to move in accordance with variations in a predetermined condition and a motor element having a portion moved in response to variations in said condition: means operatively connecting said motor element with said indicating means comprising four rigid links jointed together to form a quadrilateral structure; a fixed pivot for said structure disposed at one of the joints thereof; means operatively connecting the movable portion of said motor element with one of the two links jointed at said fixed pivot; gear means secured to one of the other two links of said structure; and a pinion pivoted at said fixed pivot and driven by said gear means to operate said indicating means.

2. In an instrument of the character described comprising indicating means actuated to move in accordance with variations in a predetermined condition: the combination of a motor element having a portion adapted to turn about a predetermined axis in response to variations in said condition; a link structure comprising four rigid links jointed together in substantially parallelogrammatic form and having one of the joints thereof held at said axis; means operatively connecting said portion of the motor element to one of the two links associated with said one joint whereby to cause said one link to be turned about said axis in response to variations in said condition; gear means secured to one of the other two links of said structure and arranged coaxially with that of the joint between said last-mentioned link and the adjacent one of said two first-mentioned links; and means pivoted at said axis and driven by said gear means to operate said indicating means.

3. In an instrument of the character described having indicating means actuated to move in accordance with the differential between two predetermined conditions and including two motor elements respectively actuated in response to variations in said predetermined conditions: a differential mechanism coupling said motor elements with said indicating means, comprising two coaxially pivoted driving members respectively angularly moved about their pivot axis by said motor elements each in the same direction in response to like variations in said conditions, a follower coupled to said indicating means, and coupling means providing independently operable movement transmissions between said follower and said driving members respectively, said movement transmissions having predetermined movement-effecting ratios opposite in sign and constant in magnitude throughout the range of movement of the driving members.

4. A mechanism for differentially coupling two separately actuated motor elements with an indicating means, comprising four rigid links jointed together to form a substantially parallelogrammatic structure, said structure being pivoted at an axis coinciding with that of one of the joints thereof; means for operatively connecting the motor elements respectively with the two links of said structure jointed at said axis; gear means secured to one of the other two links of said structure and arranged coaxially with that of the joint between said last-mentioned link and the adjacent one of said first two mentioned links; and a pinion pivoted at said axis and driven by said gear means for operating the indicating means.

5. In an instrument of the character described having a movable indicating member actuated to move in accordance with the differential between two predetermined conditions: the combination of two motor elements respectively having portions turned proportionately about a predetermined axis in response to variations in said conditions; and a differential mechanism coupling said motor elements with said indicating member, comprising four rigid links jointed together in quadrilateral form and positioned with one of the joints thereof at said axis; means respectively coupling the movable portions of said motor elements with the two links jointed at said axis to cause said links to be turned respectively about said axis in accordance with the variations in said two conditions; a pinion at said axis coupled to said indicating member; and gear means on said structure cooperating with said pinion and operatively associated with the two links jointed at said axis to cause said indicating member to receive a movement highly amplified and substantially proportional to the differential movement between said two links.

6. In an instrument of the character described having an indicating member actuated to move in accordance with the differential between two pressures and substantially duplicate Bourdon springs coaxially arranged and respectively actuated in response to the variations in said pressures: a differential mechanism for coupling said Bourdon springs with said indicating means, comprising four rigid links jointed together in quadrilateral form and having one of the joints thereof positioned at the axis of said Bourdon springs; means respectively coupling said Bourdon springs with the two links jointed at said axis to cause said links to be respectively turned about said axis in accordance with the variations in said pressures; a gear segment on one of the other two of said links arranged coaxially with that of the joint between said last-mentioned link and the adjacent one of the two links jointed at said axis; and a pinion at said axis cooperating with said gear segment and coupled to said indicating member.

7. In an instrument of the character described having a dial, and an indicating member pivoted to move across said dial to register the differential between two pressures: the combination of duplicate Bourdon springs substantially coaxially arranged and adapted to respond respectively to variations in said pressures; a differential mechanism coupling said Bourdon springs with said indicating member comprising two pivotally connected driving members; means for causing the angle between said driving members to be controlled in accordance with the difference in the actuations between said two Bourdon springs; a pinion coupled to said indicating member and pivoted at the axis of pivoting of said driving members; and gear means coupling said driving members with said pinion and causing the pinion to receive an angular amplified movement substantially proportional to the difference in angular movement between said driving members, the parts of said instrument being arranged with the axes of pivoting of said indicating member, dial and driving members all substantially coinciding with the axis of said Bourdon springs whereby to effect a highly compact structural arrangement of the instrument.

8. In an instrument of the character described having an indicating pointer angularly movable relative to a dial, a Bourdon spring responsive to the temperature at a distant point and to the ambient temperature between the instrument and said point, and a second Bourdon spring coaxially arranged to the first and responsive to the ambient temperature between the instrument and said point; means for coupling said Bourdon springs with said pointer to cause the latter to receive an amplified movement proportional to variations in the temperature at said distant point, comprising a pair of substantially angularly positioned driving members pivoted at the axis of said springs and respectively directly connected with said Bourdon springs, a pair of pivotally connected link members respectively pivoted to said driving members, said members and links forming a substantially parallelogrammatic link structure; a gear segment secured to one of said link members; and a pinion pivoted at said axis and operated by said gear segment to turn said pointer.

9. In an instrument of the character described having indicating means controlled to register the temperature at a point remote from the instrument and including separately actuatable motor elements: the combination of a differential mechanism having a follower coupled to said indicating means and two relatively movable driving members each coupled to said follower, the movement-transmitting ratios of the couplings between said follower and respective driving members being opposite in sign and unequal in magnitude; means operatively connecting said motor elements and driving members respectively; and liquid expansible means for actuating said motor elements comprising a bulb located at said point, a tube connecting said bulb with one of said motor elements, and a second tube paralleling said first tube and sealed at one end and connected at its opposite end to the other of said motor elements, and the volumetric capacities of said tubes differing by a predetermined amount to cause one of said motor elements to be actuated to greater extent than the other in response to a temperature change between the instrument and said point, whereby to compensate for the difference in the effect of such temperature change on the indicating means caused by the inequality of the movement-transmitting ratios of said couplings.

10. In an instrument of the character described having indicating means controlled to register the temperature at a point remote from the instrument and including separately actuatable Bourdon springs: the combination of a differential mechanism having a follower coupled to said indicating means and two relatively movable driving members each coupled to said follower, the movement-transmitting ratios of the couplings between said follower and respective driving members being opposite in sign and unequal in magnitude; means operatively connecting said Bourdon springs and driving members respectively; and liquid expansible means for actuating said Bourdon springs comprising a bulb located at said point, a tube connecting said bulb with one of said Bourdon springs, and a second tube paralleling said first tube and sealed at one end and connected at its opposite end to the other of said Bourdon springs, and the cross-sectional areas of the bores of said tubes differing by a predetermined amount to cause one of said Bourdon springs to be actuated to greater extent than the other in response to a temperature change between the instrument and said point, whereby to compensate for the difference in the effect of such temperature change on the indicating means caused by the inequality of the movement-transmitting ratios of said couplings.

11. In an instrument of the character described having indicating means and two separately actuated motor elements each having portions angularly movable about a predetermined axis: the combination of a pair of driving members pivoted at a point in the region of said axis and respectively operatively connected with said portions to turn proportionately with said respective portions throughout the range of actuation of the motor elements; and means for differentially transmitting angular movement from said driving members to said indicating means comprising gear means pivoted on one of said driving members and operatively connected with both said driving members to be actuated according to the difference between the angular movements of the driving members, and means pivoted at the point of pivoting of said driving members and operatively connecting said gear means with said indicating means.

12. In a device of the character described including an indicator: the combination of a pair of coaxially pivoted drive members, a pair of motor elements connected with said drive members respectively for angularly moving the same in relation to each other, gearing coupled to said indicator; and a parallel motion linkage including said drive members for coupling said motor elements to said gearing.

13. In a device of the character described including an indicating pointer and a pair of differently actuated motor elements: the combination of gearing coupled with said pointer; a parallel motion linkage coupled with said gearing; and connections between said motor elements and adjacent links of said linkage.

14. In a device of the character described including an indicator: the combination of a pair of coaxially pivoted drive members; a pair of motor elements respectively connected with said drive members to turn the members in the same direction upon similar actuations of the motor elements; a pinion journalled coaxially with said drive members and coupled with said indicator; a planetary gear pivoted to one of said drive members and in mesh with said pinion; and means operatively connecting the other of said drive members with said planetary gear and cooperating with the latter to produce a differential coupling between said motor elements and said indicator.

15. In a device of the character described including an indicator, and a pinion coupled to said indicator and a pair of separately actuated motor members: the combination of a pair of drive members pivoted at the axis of said pinion and driven respectively by said motor members; a planetary gear pivoted to one of said drive members and in mesh with said pinion; and means operatively connecting the other of said drive members with said planetary gear for imparting to said indicator a resultant movement corresponding substantially to the difference in actuation of said motor members.

16. In a device of the character described including an indicator and a pair of motor elements: the combination of a rotatable member coupled with said indicator; a pair of drive members each pivoted at the axis of said rotatable member and respectively connected with said motor elements; a planetary gear pivoted to one of said drive members and coupled with the other of said drive members to cause the gear to turn on its pivot axis in accordance with the difference in the actuations of said motor elements; and means coupling said gear to said rotatable member.

17. In an instrument of the character described having indicating means actuated to move in accordance with the differential between two predetermined conditions and including two motor elements respectively actuated in response to variations in said predetermined conditions: a differential mechanism coupling said motor elements to said indicating means, comprising two coaxially pivoted driving members respectively angularly moved about their pivot axis by said motor elements in correspondence with the variations in said conditions, a follower coupled to said indicating means, and a linkage providing independently operable movement transmissions between said follower and said respective driving members having movement-transmitting ratios constant in magnitude throughout the operative range of movement of the driving members, said linkage being adapted to impart to said follower a net motion equal to the difference between the product of the transmitting ratio of one of said movement transmissions and the distance of movement of the respectively associated driving member and the product of the transmitting ratio of the other of said movement transmissions and the distance of movement of the other of said driving members.

18. In an instrument of the character described having indicating means actuated to move in accordance with the differential between two predetermined conditions: the combination of two motor elements respectively having portions adapted to turn about a predetermined axis in response to variations in said predetermined conditions; a pair of driving members pivoted at said axis and respectively operated by said motor elements each in the same direction in response to like variations in said predetermined conditions; a shaft at said axis coupled to said indicating means; and means providing movement transmissions between said shaft and said driving members respectively, said movement transmissions having amplified transmitting ratios opposite in sign and adapted to impart to the shaft an amplified movement substantially proportional to the differential movement between said driving members.

19. In an instrument of the character described including indicating means and two separately actuatable motor devices: the combination of separate coaxilly pivoted drive members coupled respectively to said motor devices and turned in proportion to the respective actuations of said devices in the same directions in response to like actuations of the devices; and oppositely acting movement transmissions coupling said drive members to said indicating means for operating the indicating means substantially in accordance with the difference between the actuations of said motor devices.

EMIL T. JOHNSON.